US011385370B2

(12) United States Patent
Tang et al.

(10) Patent No.: US 11,385,370 B2
(45) Date of Patent: Jul. 12, 2022

(54) MICROSEISMIC INTELLIGENT ACQUISITION AND DATA WIRELESS TRANSMISSION SYSTEM OF ROCK

(71) Applicant: Dalian University of Technology, Dalian (CN)

(72) Inventors: Shibin Tang, Dalian (CN); Jiaming Li, Dalian (CN)

(73) Assignee: Dalian University of Technology

( * ) Notice: Subject to any disclaimer, the term of this patent is extended or adjusted under 35 U.S.C. 154(b) by 351 days.

(21) Appl. No.: 16/833,048

(22) Filed: Mar. 27, 2020

(65) Prior Publication Data
US 2021/0173108 A1 Jun. 10, 2021

(30) Foreign Application Priority Data
Dec. 10, 2019 (CN) .......................... 201911257899.4

(51) Int. Cl.
*G01V 1/30* (2006.01)
*G01V 1/00* (2006.01)
(Continued)

(52) U.S. Cl.
CPC ................ *G01V 1/30* (2013.01); *G01V 1/003* (2013.01); *G01V 1/164* (2013.01); *G01V 1/223* (2013.01); *G01V 1/247* (2013.01)

(58) Field of Classification Search
CPC .......... G01V 1/30; G01V 1/003; G01V 1/164; G01V 1/223; G01V 1/247; G01V 1/28; G01V 1/288; G08C 17/02
See application file for complete search history.

(56) References Cited

U.S. PATENT DOCUMENTS

2014/0100786 A1* 4/2014 Ma .......................... G01V 1/40
702/16
2017/0343689 A1* 11/2017 Dykstra ................. G01V 1/288
(Continued)

FOREIGN PATENT DOCUMENTS

CN 110749497 A * 2/2020 ............... G01N 3/02
CN 110910613 A * 3/2020 ............... G01V 1/22
(Continued)

*Primary Examiner* — Daniel Pihulic
(74) *Attorney, Agent, or Firm* — McAndrews, Held & Malloy, Ltd.

(57) ABSTRACT

The present invention discloses a microseismic intelligent acquisition and data wireless transmission system of rock. The microseismic intelligent acquisition and data wireless transmission system of rock comprises a data acquisition and intelligent process module, used for acquiring an original microseismic signal and intelligently processing the original microseismic signal to obtain a timed second microseismic signal data packet; a wireless transmission module, connected with the data acquisition and intelligent process module. The data acquisition and intelligent process module transmits the timed second microseismic signal data packet to a satellite in a wireless manner through the wireless transmission module such that the satellite receives and stores the timed second microseismic signal data packet. The microseismic intelligent acquisition and data wireless transmission system of rock of the present invention is free from the wire transmission, largely reduces the workload of manual field monitoring, and improves the quality of monitoring data.

9 Claims, 2 Drawing Sheets

(51) Int. Cl.
 _G01V 1/16_ (2006.01)
 _G01V 1/22_ (2006.01)
 _G01V 1/24_ (2006.01)

(56) References Cited

U.S. PATENT DOCUMENTS

| | | | |
|---|---|---|---|
| 2018/0106147 A1* | 4/2018 | Lakings | G01V 1/44 |
| 2019/0302291 A1* | 10/2019 | Lolla | G01V 1/288 |
| 2019/0324166 A1* | 10/2019 | Lolla | G01V 1/42 |
| 2020/0341159 A1* | 10/2020 | Le Calvez | G01V 1/288 |
| 2021/0173107 A1* | 6/2021 | Tang | G01V 1/22 |
| 2021/0173108 A1* | 6/2021 | Tang | G01V 1/223 |

FOREIGN PATENT DOCUMENTS

| | | | | |
|---|---|---|---|---|
| CN | 110942610 A | * | 3/2020 | G01V 1/003 |
| CN | 111208198 A | * | 5/2020 | |
| CN | 111208211 A | * | 5/2020 | G01N 29/045 |
| CN | 112384937 A | * | 2/2021 | G01V 1/28 |

* cited by examiner

MICROSEISMIC INTELLIGENT ACQUISITION AND DATA WIRELESS TRANSMISSION SYSTEM OF ROCK

CROSS-REFERENCE TO RELATED APPLICATIONS

This application claims priority to Chinese patent application 201911257899.4, filed Dec. 10, 2019, the disclosure of which is incorporated herein by reference.

TECHNICAL FIELD

The present invention relates to the technical field of rock engineering, and in particular, to a microseismic intelligent acquisition and data wireless transmission system of rock.

BACKGROUND

With the development of economic construction in China, mining, hydraulic, municipal and traffic engineering construction projects all relate to stability of rock engineering. The rock engineering has complex geological conditions. Under the external actions of human engineering activity, earthquake, rainfall, reservoir level variation and the like, the rock engineering is easy to be instable to cause engineering/geological disasters such as landslide, collapse and the like. There must be some omens when the rock is instable. If information characteristics and a change rule of the omens can be handled, damage caused by instability of the rock can be accurately early warned, and disaster prevention measures can be implemented timely, so that disaster loss can be reduced to a maximum extent. Therefore, monitoring of rock engineering breakage is very important. Rock breakage generation and crack expansion generate an elastic wave, and the elastic wave quickly propagates in surrounding rocks. Such elastic wave is called microseism. In recent years, with the rapid development of computer technology, geophysics and quantitative seismology, microseismic monitoring technology is widely applied to the rock engineering.

However, in the existing microseismic monitoring technology for stability of the rock, there are multiple problems in functions and performances of a monitoring device. According to the microseismic monitoring technology of the rock engineering, firstly breakage information of the rock is acquired by utilizing a microseismic sensor and then is transmitted to a microseismic signal processor in a wire manner. The current wire manner for connecting the microseismic monitoring sensor and the microseismic signal processor has the following shortages: (1) the wire connection manner is inconvenient in engineering construction, it influences the construction, and the construction also usually disturbs arrangement of microseismic monitoring lines; (2) the construction usually breaks a connection line to cause interruption of microseismic signal acquisition, and then acquired data is lost; thus, competition and real time of signal acquisition cannot be met, and accuracy and prevision of a monitoring result are also influenced; (3) in the wire connection manner, its line arrangement has a large workload and high costs, and is easy to be influenced by animals such as cattle, sheep and the like in the field; electrified cables also have a certain hidden danger; (4) a too-long cable may increase the resistance to cause that an arrangement range of sensors connected with each microseismic signal processor can be only limited to several hundred meters around the microseismic signal processor, thereby limiting that the microseismic monitoring technology cannot be largely applied to the rock engineering; (5) the microseismic signal processor has high costs, and if it is installed in the field, it is easy to be rained, lost and the like; (6) each current microseismic signal processor can be only connected with very finite quantity of microseismic monitoring sensors; to increase the quantity of the sensors or to expand a monitoring range, only more microseismic signal processors are installed in the monitoring field so as to largely increase the monitoring costs; (7) operation of the microseismic monitoring sensor needs a power supply of the microseismic monitoring signal processor, so, when there is no power supply in the field, the microseismic monitoring technology cannot be implemented; (8) in the current monitoring device, once line arrangement is completed, a topological structure between the microseismic monitoring sensors and the microseismic monitoring signal processor is also fixed, and the microseismic monitoring signal processor connected with the microseismic monitoring sensors is hard to be changed; (9) the wire connection manner further usually needs labors to maintain, which go against application of the microseismic monitoring technology for stability of the rock engineering in remote regions, high and cold regions, and high-altitude regions. Besides the above problems, the current wire connection manner still has multiple problems that a broken sensor is difficult to be changed, sensor arrangement is not flexible and the like.

SUMMARY

An objective of the present invention is to provide a microseismic signal transmission system of rock, which has low labor costs, high quality of monitoring data, great applicability, high dynamicity and strong real time.

To achieve the above objective, the present invention provides a microseismic intelligent acquisition and data wireless transmission system of rock, which comprises:

a data acquisition and intelligent process module, used for acquiring an original microseismic signal and intelligently processing the original microseismic signal to obtain a timed second microseismic signal data packet;

a wireless transmission module, connected with the data acquisition and intelligent process module, wherein the data acquisition and intelligent process module transmits the timed second microseismic signal data packet to a satellite in a wireless manner through the wireless transmission module such that the satellite receives and stores the timed second microseismic signal data packet.

The data acquisition and intelligent process module is an artificial intelligence (AI) acceleration sensor, which comprises:

a data acquisition submodule, used for acquiring the original microseismic signal;

a signal conditioning submodule, connected with the data acquisition submodule and used for amplifying and converting the original microseismic signal to obtain a first microseismic signal;

an intelligent process submodule, connected with the signal conditioning submodule and used for conducting self diagnosis, self calibration, correction and error compensation on the first microseismic signal to obtain a second microseismic signal.

Preferably, the signal conditioning submodule comprises:

a signal amplification unit, connected with the data acquisition submodule and used for amplifying the original microseismic signal to obtain a first sub-signal;

an analog-to-digital conversion unit, connected with the signal amplification unit and used for conducting analog-to-digital conversion on the first sub-signal to obtain a second sub-signal, which is the first microseismic signal.

Preferably, the intelligent process submodule comprises:

a wave detection unit, connected with the analog-to-digital conversion unit and used for receiving the first microseismic signal;

an intelligent process unit, connected with a receiving unit and used for conducting self diagnosis, self calibration, correction and error compensation on the first microseismic signal to obtain the second microseismic signal;

a determination unit, connected with the intelligent process unit, wherein the determination unit is internally installed with a waveform database and is used for setting a waveform threshold according to the waveform database; determining the second microseismic signal according to the waveform threshold; transmitting the second microseismic signal through the wireless transmission system if the second microseismic signal is greater than or equal to the waveform threshold; not transmitting if the second microseismic signal is less than the waveform threshold; the waveform database is manually updated.

Preferably, the data acquisition and intelligent process module further comprises:

a GPS timing unit, connected with the determination unit and used for conducting time synchronization on the second microseismic signal to obtain the timed second microseismic signal data packet and return it to the determination unit.

Preferably, the microseismic intelligent acquisition and data wireless transmission system of rock further comprises:

a storage module, configured between the determination unit and the wireless transmission module and used for storing the timed second microseismic signal data packet.

Preferably, the microseismic intelligent acquisition and data wireless transmission system of rock further comprises:

a battery module, respectively connected with the data acquisition and intelligent process module, the wireless transmission module and the storage module and used for supplying power to the data acquisition and intelligent process module, the wireless transmission module and the storage module.

Preferably, the microseismic signal transmission system of rock further comprises:

a lightning protection module, configured relative to the wireless transmission module and used for guiding lightning strike underground and preventing from damaging the system.

Preferably, the wireless transmission module comprises:

a wireless transmission unit, connected with the signal conditioning module; wherein the signal conditioning module transmits the timed second microseismic signal data packet to the satellite in the wireless manner through the wireless transmission module such that the satellite receives and stores the timed second microseismic signal data packet;

a verification unit, connected with the wireless transmission unit and used for detecting whether data transmission of the wireless transmission unit is successful; if no, conducting a repeated transmission command and transmitting the data through the wireless transmission unit; if yes, ending the data transmission.

Preferably, the battery module comprises a solar cell unit and a storage battery unit.

The solar cell unit and the storage battery unit are connected with the data acquisition and intelligent process module, the signal conditioning module, the wireless transmission module and the storage module. The solar cell unit and the storage battery unit are connected.

When the output power of the solar cell unit is greater than the total power of loads, the solar cell unit simultaneously supplies power to the loads and the storage battery unit. The loads are the data acquisition and intelligent process module, the signal conditioning module, the wireless transmission module and the storage module.

When the output power of the solar cell unit is equal to the total power of the loads, the solar cell unit supplies power to the loads.

When the output power of the solar cell unit is less than the total power of the loads, the storage battery unit supplies power to the loads.

According to specific embodiments provided by the present invention, the present invention discloses the following technical effects:

the present invention acquires and processes data through the data acquisition and intelligent process module and the signal conditioning module and transmits the data to the satellite in the wireless manner, and a remote control center acquires the processed data through the satellite. The system of the present invention is free from the traditional wire transmission, largely reduces the workload of manual field monitoring, improves the quality of monitoring data, does not have special requirements on the regions, has general applicability, can remotely transmit data in the wireless manner and has high dynamicity and strong real time.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

Figure 1:
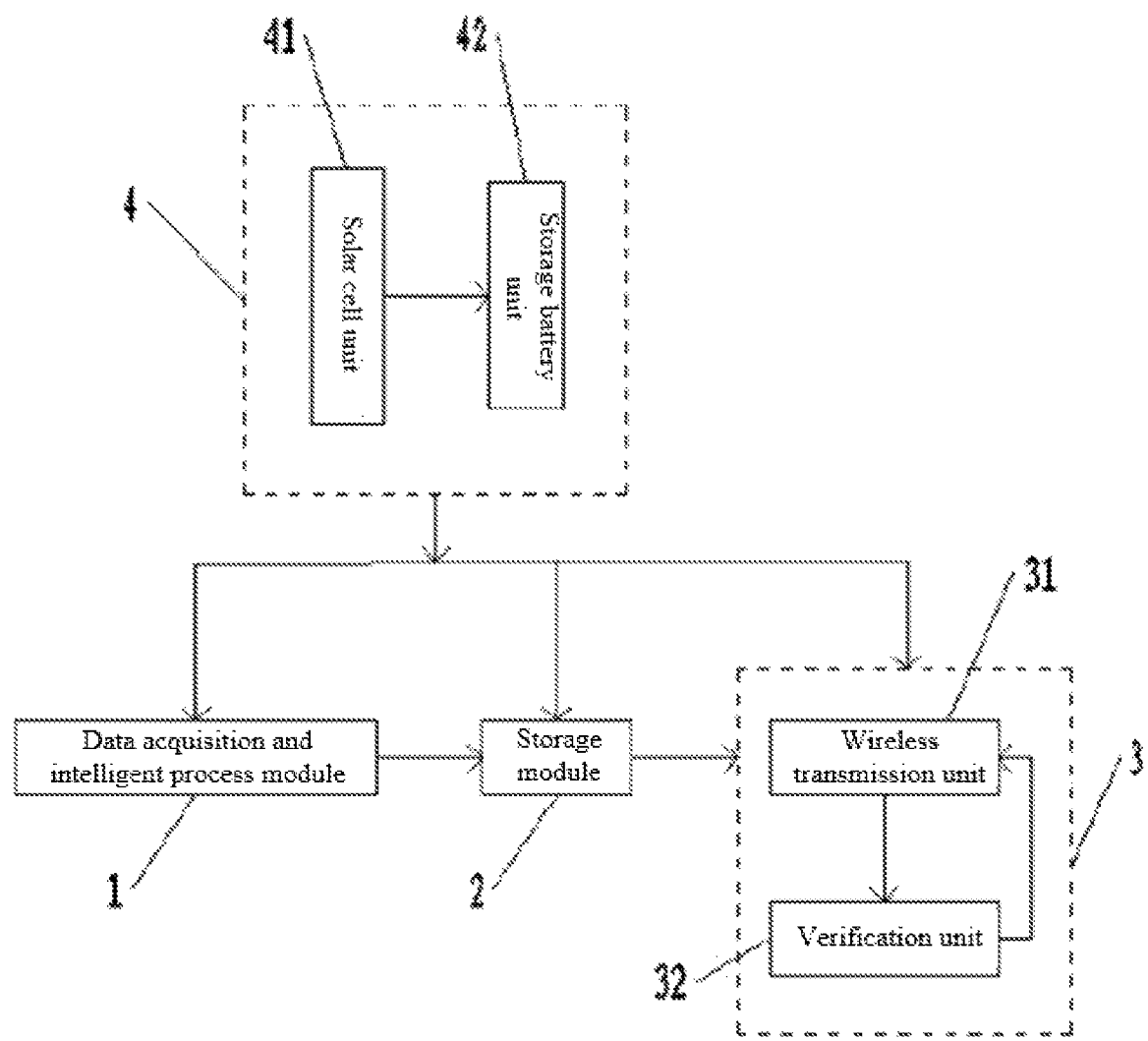
FIG. 1 is a schematic structural diagram of a microseismic signal transmission system of rock in the present invention.

In the drawings: 1—data acquisition and intelligent process module, 2—storage module, 3—wireless transmission module, 4—battery module, 11—data acquisition submodule, 12—signal conditioning submodule, 13—intelligent process submodule, 14—GPS timing unit, 31—wireless transmission unit, 32—verification unit, 41—solar cell unit, 42—storage battery unit, 121—signal amplification unit, 122—analog-to-digital conversion unit, 131—wave detection unit, 132—intelligent process unit, and 134—determination unit.

DESCRIPTION OF THE EMBODIMENTS

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a microseismic intelligent acquisition and data wireless transmission system of rock.

To make the foregoing objective, features, and advantages of the present invention more apparent and more comprehensible, the present invention is further described in detail below with reference to the accompanying drawings and specific embodiments.

Figure 2:
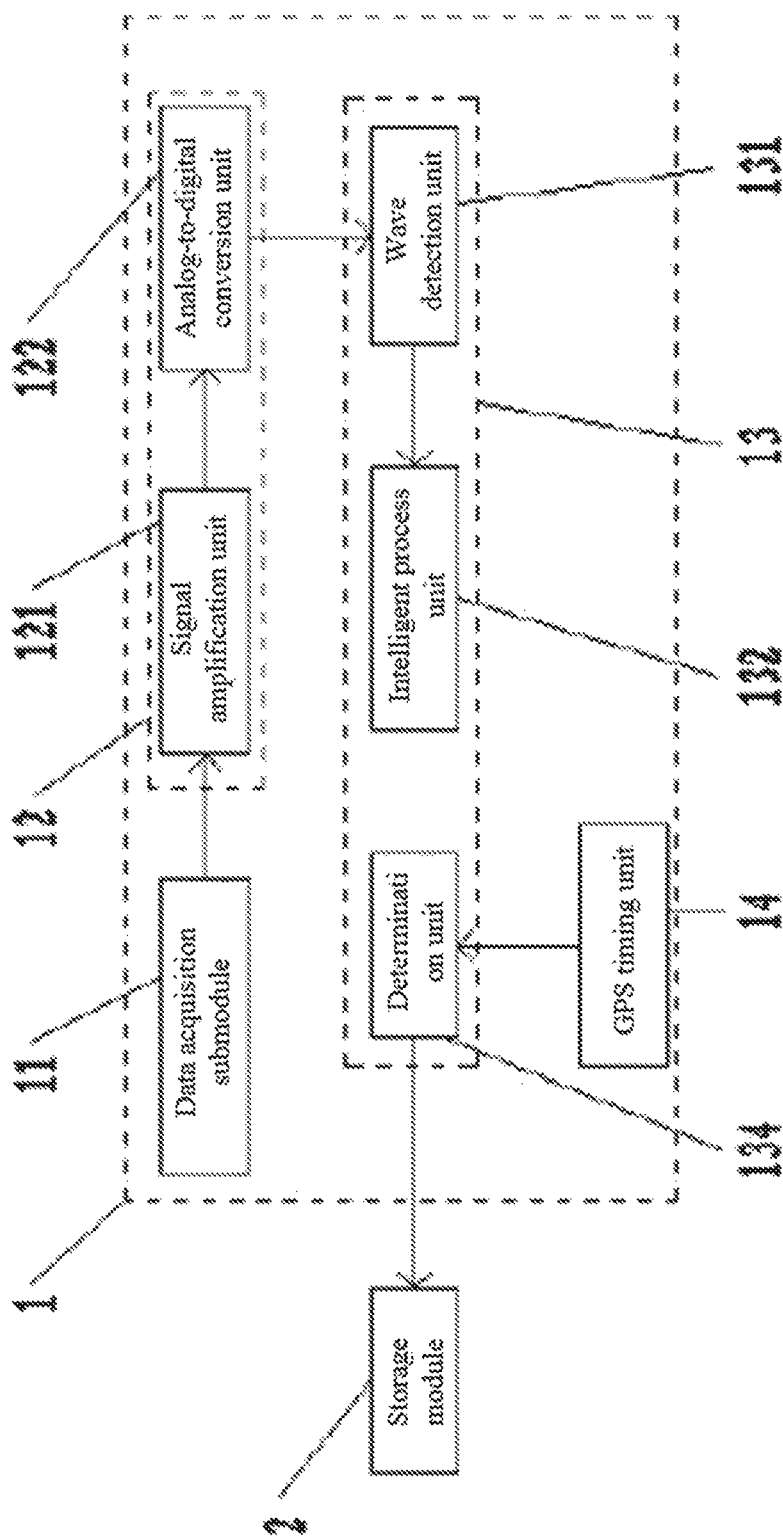
FIG. 2 is a schematic structural diagram of a signal conditioning module of the present invention.

As shown in FIG. 1 and FIG. 2, the microseismic intelligent acquisition and data wireless transmission system of rock of the present invention comprises a data acquisition and intelligent process module 1 and a wireless transmission module 3.

The data acquisition and intelligent process module 1 is used for acquiring an original microseismic signal and intelligently processing the original microseismic signal to obtain a timed second microseismic signal data packet.

The wireless transmission module 3 is connected with the data acquisition and intelligent process module 1. The data acquisition and intelligent process module 1 transmits the timed second microseismic signal data packet to a satellite in a wireless manner through the wireless transmission module 3 such that the satellite receives and stores the timed second microseismic signal data packet.

Wherein the data acquisition and intelligent process module is an artificial intelligence (AI) acceleration sensor. As an optional embodiment, the data acquisition and intelligent process module 1 of the present invention comprises a data acquisition submodule 11, a signal conditioning submodule 12 and an intelligent process submodule 13.

The data acquisition submodule 11 is used for acquiring the original microseismic signal. The data acquisition submodule 11 is an acceleration sensor. When the acceleration sensor senses microseism, a coil of the acceleration sensor receives a strong excitation pulse signal, and vibration wires close to the coil vibrate because of electromagnetic induction effect, thereby obtaining the original microseismic signal. The original microseismic signal is an analog electrical signal.

The signal conditioning submodule 12 is connected with the data acquisition submodule 11. The signal conditioning module 12 is used for amplifying and converting the original microseismic signal to obtain a first microseismic signal.

The intelligent process submodule 13 is connected with the signal conditioning submodule 12. The intelligent process submodule 13 is used for conducting self diagnosis, self calibration, correction and error compensation on the first microseismic signal to obtain a second microseismic signal.

As an optional embodiment, the signal conditioning submodule 12 of the present invention comprises a signal amplification unit 121 and an analog-to-digital conversion unit 122.

The signal amplification unit 121 is connected with the data acquisition submodule 11. The signal amplification unit 121 is used for amplifying the original microseismic signal to obtain a first sub-signal.

The analog-to-digital conversion unit 122 is connected with the signal amplification unit 121. The analog-to-digital conversion unit 122 is used for conducting analog-to-digital conversion on the first sub-signal to obtain a second sub-signal. The second sub-signal is the first microseismic signal.

As an optional embodiment, the intelligent process submodule 13 of the present invention comprises a wave detection unit 131, an intelligent process unit 132 and a determination unit 134.

The wave detection unit 131 is connected with the analog-to-digital conversion unit 122. The wave detection unit 131 is used for receiving the first microseismic signal.

The intelligent process unit 132 is connected with a receiving unit. The intelligent process unit 132 is used for conducting self diagnosis, self calibration, correction and error compensation on the first microseismic signal to obtain the second microseismic signal.

The determination unit 134 is connected with the intelligent process unit 132. The determination unit 134 is internally installed with a waveform database and is used for setting a waveform threshold according to the waveform database; determining the second microseismic signal according to the waveform threshold; transmitting the second microseismic signal through the wireless transmission system if the second microseismic signal is greater than or equal to the waveform threshold; not transmitting if the second microseismic signal is less than the waveform threshold. The waveform database is manually updated.

As an optional embodiment, the data acquisition and intelligent process module 1 of the present invention further comprises:

a GPS timing unit 14, connected with the determination unit 134 and used for conducting time synchronization on the second microseismic signal to obtain the timed second microseismic signal data packet and return it to the determination unit 134.

As an optional embodiment, the microseismic intelligent acquisition and data wireless transmission system of rock of the present invention further comprises:

a storage module 2, configured between the determination unit 134 and the wireless transmission module 3 and used for storing the timed second microseismic signal data packet.

As an optional embodiment, the microseismic intelligent acquisition and data wireless transmission system of rock of the present invention further comprises:

a battery module 4, respectively connected with the data acquisition and intelligent process module 1, the wireless transmission module 3 and the storage module 2 and used for supplying power to the data acquisition and intelligent process module 1, the wireless transmission module 3 and the storage module 2.

As an optional embodiment, the battery module 4 of the present invention comprises a solar cell unit 41 and a storage battery unit 42.

The solar cell unit 41 and the storage battery unit 42 are connected with the data acquisition and intelligent process module, the signal conditioning module, the wireless transmission module 3 and the storage module 2. The solar cell unit 41 and the storage battery unit 42 are connected.

When the output power of the solar cell unit 41 is greater than the total power of loads, the solar cell unit 41 simultaneously supplies power to the loads and the storage battery unit 42. The loads are the data acquisition and intelligent process module 1, the wireless transmission module 3 and the storage module 2.

When the output power of the solar cell unit 41 is equal to the total power of the loads, the solar cell unit 41 supplies power to the loads.

When the output power of the solar cell unit 41 is less than the total power of the loads, the storage battery unit 42 supplies power to the loads.

To help the present invention to fit for more severe environments, the battery module 45 further comprises a wind power generation unit. The wind power generation unit has the same function as the solar cell unit 41 and can ensure that the present invention still regularly works when the output power of the solar cell unit 41 is seriously insufficient caused by long-term low illumination intensity or other situations.

As an optional embodiment, the wireless transmission module 3 of the present invention comprises:

a wireless transmission unit 31, connected with the signal conditioning module; wherein the signal conditioning module transmits the timed second microseismic signal data packet to the satellite in the wireless manner through the wireless transmission module 3 such that the satellite receives and stores the timed second microseismic signal data packet;

a verification unit 32, connected with the wireless transmission unit 31 and used for detecting whether data transmission of the wireless transmission unit 31 is successful; if no, conducting a repeated transmission command and transmitting the data through the wireless transmission unit 31; if yes, ending data transmission.

Preferably, the system of the present invention is further provided with a protection box to prevent to be influenced by the dusty wind weather or other aspects. The data acquisition and intelligent process module 1, the storage battery unit 42, the storage module 2 and the wireless transmission module 3 all are arranged in the protection box. The solar cell unit 41 is placed at the top of the protection box.

Furthermore, the system of the present invention is further provided with a lightning protection module to avoid damage from the thunderstorm.

The lightning protection module is arranged on the upper side of a collection box and specifically comprises a lightning arrester, a down lead and a ground connector to guide the lightning strike underground.

To achieve a better lightning protection effect, the present invention further conducts edge insulation on the collection box and the solar cell unit 41.

The present invention acquires the original microseismic signal through the data acquisition module, processes the original microseismic signal through the signal conditioning module and the data acquisition and intelligent process module, transmits the processed signal to the satellite in the wireless manner. Therefore, the present invention has flexibility and simpler structure. Furthermore, the present invention adopts the wireless communication manner and has a power supply so as to be capable of fitting for high and cold, high-altitude severe environments. Additionally, the whole system is simply configured, is easy to operate, and has a great practicability. The whole system is also provided with corresponding protection measures, so its safety can be protected to a great extent, and long-term detection and maintenance are avoided.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In addition, a person of ordinary skill in the art can make various modifications in terms of specific embodiments and scope of application in accordance with the teachings of the present invention. In conclusion, the content of this specification shall not be construed as a limitation to the present invention.

What is claimed is:

1. A microseismic intelligent acquisition and data wireless transmission system of rock, comprising:

a data acquisition and intelligent process module, used for acquiring an original microseismic signal and intelligently processing the original microseismic signal to obtain a timed second microseismic signal data packet; and a wireless transmission module, connected with the data acquisition and intelligent process module, wherein the data acquisition and intelligent process module transmits the timed second microseismic signal data packet to a satellite in a wireless manner through the wireless transmission module such that the satellite receives and stores the timed second microseismic signal data packet;

wherein the data acquisition and intelligent process module is an artificial intelligence (AI) acceleration sensor, which comprises:

a data acquisition submodule, used for acquiring the original microseismic signal;

a signal conditioning submodule, connected with the data acquisition submodule and used for amplifying and converting the original microseismic signal to obtain a first microseismic signal; and an intelligent process submodule, connected with the signal conditioning submodule and used for conducting self diagnosis, self calibration, correction and error compensation on the first microseismic signal to obtain a second microseismic signal.

2. The microseismic intelligent acquisition and data wireless transmission system of rock according to claim 1, wherein the signal conditioning submodule comprises:

a signal amplification unit, connected with the data acquisition submodule and used for amplifying the original microseismic signal to obtain a first sub-signal; and an analog-to-digital conversion unit, connected with the signal amplification unit and used for conducting analog-to-digital conversion on the first sub-signal to obtain a second sub-signal, which is the first microseismic signal.

3. The microseismic intelligent acquisition and data wireless transmission system of rock according to claim 2, wherein the intelligent process submodule comprises:

a wave detection unit, connected with the analog-to-digital conversion unit and used for receiving the first microseismic signal;

an intelligent process unit, connected with a receiving unit and used for conducting self diagnosis, self calibration, correction and error compensation on the first microseismic signal to obtain the second microseismic signal; and a determination unit, connected with the intelligent process unit, wherein the determination unit is internally installed with a waveform database and is used for setting a waveform threshold according to the waveform database, determining the second microseismic signal according to the waveform threshold, transmitting the second microseismic signal through the wireless transmission system if the second microseismic signal is greater than or equal to the waveform threshold, and not transmitting if the second microseismic signal is less than the waveform threshold; wherein the waveform database is manually updated.

4. The microseismic intelligent acquisition and data wireless transmission system of rock according to claim 3, wherein the data acquisition and intelligent process module further comprises:

a GPS timing unit, connected with the determination unit and used for conducting time synchronization on the second microseismic signal to obtain the timed second microseismic signal data packet and return it to the determination unit.

5. The microseismic intelligent acquisition and data wireless transmission system of rock according to claim 1, further comprising:
a storage module, configured between the determination unit and the wireless transmission module and used for storing the timed second microseismic signal data packet.

6. The microseismic intelligent acquisition and data wireless transmission system of rock according to claim 5, further comprising:
a battery module, respectively connected with the data acquisition and intelligent process module, the wireless transmission module and the storage module and used for supplying power to the data acquisition and intelligent process module, the wireless transmission module and the storage module.

7. The microseismic intelligent acquisition and data wireless transmission system of rock according to claim 1, further comprising:
a lightning protection module, configured relative to the wireless transmission module and used for guiding a lightning strike underground and preventing from damaging the system.

8. The microseismic intelligent acquisition and data wireless transmission system of rock according to claim 1, wherein the wireless transmission module comprises:
a wireless transmission unit, connected with the signal conditioning module; wherein the signal conditioning module transmits the timed second microseismic signal data packet to the satellite in the wireless manner through the wireless transmission module such that the satellite receives and stores the timed second microseismic signal data packet; and
a verification unit, connected with the wireless transmission unit and used for;
detecting whether data transmission of the wireless transmission unit is successful;
if not successful, conducting a repeated transmission command and transmitting the data through the wireless transmission unit; and
if successful, ending the data transmission.

9. The microseismic intelligent acquisition and data wireless transmission system of rock according to claim 6, wherein the battery module comprises a solar cell unit and a storage battery unit;
the solar cell unit and the storage battery unit are connected with the data acquisition and intelligent process module, the signal conditioning module, the wireless transmission module and the storage module; the solar cell unit and the storage battery unit are connected;
when the output power of the solar cell unit is greater than the total power of loads, the solar cell unit simultaneously supplies power to the loads and the storage battery unit; the loads are the data acquisition and intelligent process module, the signal conditioning module, the wireless transmission module and the storage module;
when the output power of the solar cell unit is equal to the total power of the loads, the solar cell unit supplies power to the loads; and
when the output power of the solar cell unit is less than the total power of the loads, the storage battery unit supplies power to the loads.

* * * * *